United States Patent
Hammershøj

(10) Patent No.: US 12,113,876 B2
(45) Date of Patent: Oct. 8, 2024

(54) SYSTEM AND METHOD FOR PROVIDING MULTICAST TO UNICAST SERVICES

(71) Applicant: mediathand ApS, Copenhagen SV (DK)

(72) Inventor: Allan Dyhr Hammershøj, Copenhagen SV (DK)

(73) Assignee: mediathand ApS, Copenhagen SV (DK)

( * ) Notice: Subject to any disclaimer, the term of this patent is extended or adjusted under 35 U.S.C. 154(b) by 49 days.

(21) Appl. No.: 17/908,931

(22) PCT Filed: Feb. 26, 2021

(86) PCT No.: PCT/DK2021/050058
§ 371 (c)(1),
(2) Date: Sep. 2, 2022

(87) PCT Pub. No.: WO2021/175394
PCT Pub. Date: Sep. 10, 2021

(65) Prior Publication Data
US 2023/0188623 A1    Jun. 15, 2023

(30) Foreign Application Priority Data
Mar. 2, 2020    (DK) .............................. PA202070133

(51) Int. Cl.
*H04L 67/567*    (2022.01)
*H04N 21/6405*    (2011.01)
*H04N 21/6408*    (2011.01)

(52) U.S. Cl.
CPC ....... *H04L 67/567* (2022.05); *H04N 21/6405* (2013.01); *H04N 21/6408* (2013.01)

(58) Field of Classification Search
None
See application file for complete search history.

(56) References Cited

U.S. PATENT DOCUMENTS

| 8,925,017 | B1 | 12/2014 | Howard, Jr. |
| 9,094,728 | B1 | 7/2015 | Hefner et al. |

(Continued)

FOREIGN PATENT DOCUMENTS

EP    3451678 A1    3/2019

OTHER PUBLICATIONS

International Search Report, Application No. PCT/DK2021/050058, Mailed Apr. 29, 2021, 6 pages.

(Continued)

*Primary Examiner* — Mohamed Ibrahim
(74) *Attorney, Agent, or Firm* — Nordic Patent Service

(57) ABSTRACT

A smart casting device includes a broadcast hardware interface coupled to one or more external program material sources, a network controller coupled to one or more digital devices through a network, a service logic controller configured to control the broadcast hardware interface and the network controller to advertise identified ones of the one or more external program material sources to the one or more digital devices, convey, to one or more service providers accessible through the identified external program material sources, subscriptions from the one or more digital devices for program services, and in response to the subscriptions, receive the program services from the one or more service providers and provide the received program services to the one or more subscribing digital devices.

17 Claims, 3 Drawing Sheets

(56) References Cited

U.S. PATENT DOCUMENTS

| | | | |
|---|---|---|---|
| 9,414,095 B1 | 8/2016 | Corda et al. | |
| 2009/0089251 A1* | 4/2009 | Johnston | H04N 21/4828 |
| 2009/0147718 A1 | 6/2009 | Liu et al. | |
| 2009/0293095 A1 | 11/2009 | Karaoguz et al. | |
| 2011/0268010 A1 | 11/2011 | Yamada | |
| 2011/0299410 A1 | 12/2011 | Diab et al. | |
| 2012/0192217 A1* | 7/2012 | Jeong | H04N 21/4882 |
| | | | 725/32 |
| 2013/0125175 A1* | 5/2013 | Hao | H04N 21/4882 |
| | | | 725/62 |
| 2016/0073146 A1 | 3/2016 | Phillips et al. | |
| 2017/0094345 A1 | 3/2017 | Zerr et al. | |
| 2019/0182300 A1 | 6/2019 | Simotas et al. | |
| 2019/0238897 A1 | 8/2019 | Nei et al. | |

OTHER PUBLICATIONS

Vidya et al, A Pay TV Operator's Key to Multiscreen Live Streaming [bulletin board online] Frost & Sullivan, [retrieved on Mar. 24, 2021], Retrieved from https://broadpeak.tv/form/multicast-abr-a-pay-tv-operators-key-to-multiscreen-live-streaming/, retrieved Sep. 1, 2022.

Danish Patent and Trademark Office, Search Report, Application No. PA202070133, Mailed Aug. 24, 2020, 3 pages.

Bichot, "Multicast ABR business cases", DVB, Digital Video Broadcasting, Nov. 26, 2018, 11 pages.

European Patent Office, Partial Supplementary European Search Report, Application No. 21765203.1, mailed Feb. 16, 2024, 17 pages.

\* cited by examiner

SYSTEM AND METHOD FOR PROVIDING MULTICAST TO UNICAST SERVICES

FIELD

The present disclosure relates to providing a multicast to unicast service within a network.

BACKGROUND

For purposes of this disclosure the following acronyms are defined:
- 5G—Fifth Generation Wireless Technology for Digital Cellular Networks
- AI—Artificial Intelligence
- API—Application Programming Interface
- ATSC—Advanced Television Systems Committee
- AV—Audio Visual
- CA—Conditional Access
- CDMA—Code Division Multiple Access
- DASH—Dynamic Adaptive Streaming over HTTP
- DOCSIS®—Data Over Cable Service Interface Specification
- DSL—Digital Subscriber Line
- DTT—Digital Terrestrial Television
- DVB—Digital Video Broadcasting
- DVB-C—Digital Video Broadcasting-Cable
- DVB-C2—Digital Video Broadcasting-Cable, $2^{nd}$ Generation
- DVB-DASH—DVB Dynamic Adaptive Streaming over HTTP
- DVB-I—Digital Video Broadcasting-Internet
- DVB-S2—Digital Video Broadcasting-Satellite, $2^{nd}$ Generation
- DVB-T2—Digital Video Broadcasting-Terrestrial, $2^{nd}$ Generation
- DVB-x2—Digital Video Broadcasting-$2^{nd}$ Generation
- DVD—Digital Versatile Disc
- enTV—Enhanced Television
- eMBMS—Evolved Multimedia Broadcast Multicast Services
- EPG—Electronic Program Guide
- FeMBMS—Further Evolved Multimedia Broadcast Multicast Services
- FLUTE—File Delivery over Unidirectional Transport
- FWA—Fixed Wireless Access
- GSE—Generic Stream Encapsulation
- GSM—Global System for Mobile Communications
- GUI—Graphical User Interface
- HD—High Definition
- HDMI—High Definition Multimedia Interface
- HLS—HTTP Live Streaming
- IMB—Integrated Mobile Broadcast,
- ISDB—Integrated Services Digital Broadcasting
- IP—Internet protocol
- M-ABR—Multicast Adaptive Bit Rate Streaming
- MMTP—MPEG Media Transport Protocol
- MPEG—Moving Picture Experts Group
- MPTS—Multiple Program Transport Streams
- MRAID—Mobile Rich Media Ad Interface Definitions
- OTT—over the top
- QUIC—Quick UDP Internet Connections
- ROUTE—Real-time Object Delivery over Unidirectional Transport
- SCTE35—Digital Program Insertion Cueing Message for Cable
- SD—standard definition
- SoC—System on a Chip
- SPTS—Single Program Transport Stream
- STB—set top box
- TV—Television
- UI—User Interface
- UDP—User Datagram Protocol
- VAST—Video Ad Serving Template
- VR/AR—virtual reality/augmented reality
- WiMAX—Worldwide Interoperability for Microwave Access The consumption of live unicast program content has dramatically increased with the increase of video on demand and mobile device applications. One of the drawbacks of unicast content is that it requires low packet loss and a large constant bandwidth. In addition, unicast traffic is proportional to the number of individual consuming devices as opposed to the number of linear channels.

Broadcast organizations have struggled to keep up with the rapid development of OTT-based services delivery and the fast uptake of new formats and standards. Traditional broadcast techniques have been focused on reliable content delivery to ensure a broad compatibility of both new and especially older TV sets. Major updates like switching from analog to digital, MPEG2 to MPEG4, SD to HD have typically been accomplished over long sunsetting periods. The focus of the broadcast organizations has been to create an infrastructure to deliver high-quality live linear TV signals to TV tuners with very limited interactivity, for example, simple EPGs, text TV and the ability to quickly change channels.

Later visual and audio quality improvements have been implemented with the introduction of the standard DVD, BluRay DVD, streaming, and interactive features like addressable TV and accompanying services, and delivering these services to multiple types of devices. For example, the development of large touchscreen mobile devices and high throughput Internet reliability enable a user to watch content on a wide variety of devices, at times unrestricted by broadcast time. These developments challenge the traditional TV service model. The introduction of "Smart TVs" including installable applications (apps) has helped bolster the traditional TV service model, but as TVs are only replaced approximately every 7 years or so, the "smart functions" become outdated very quickly, as the internal hardware typically cannot be easily updated. Instead of using the smart functions of the TV, off-the-shelf STBs, for example, Apple TV, Android TV, Amazon Firestick, Roku, etc. and casting devices like Chromecast® can instead be connected to the HDMI ports of the TV and thereby become easily updatable "smart hardware" of the TV.

In a streaming world, new video and audio features are easily implemented, for example, with newer and smarter codecs, higher resolution (4K, 8K, etc.), and immersive audio/video features like 3D audio and VR/AR. Unlike traditional broadcast one-to-all transmitting, streaming implementations can automatically select a feed that is compatible with the device requesting it.

A significant advantage of traditional broadcasting has been the nature of the managed network and the dedicated spectrum that ensures a unified experience when receiving TV signals and a reliable, high-quality, low latency reception of live signals. This is especially important when watching live shows or sports, where viewers are able to watch the action in real-time as it occurs, without the latency limitations in even the best IP networks and streaming protocols optimized to ensure reliable delivery over ever changing network conditions.

It should be noted that the latest broadcasting technology specifications have tried to incorporate the best of all worlds into a single specification. For example, the ATSC 3.0 standard, tested in the United States and applied in South Korea, is a non-backward compatible, IP-based broadcast technology supporting DTT networks as well as distribution over existing IP-enabled networks with two-way interaction in both networks. This approach has also been taken by the DVB consortium, and traditional standard development in DVB, focusing mainly on specifying the physical layers of broadcast, has more or less been replaced by working groups with the tasks of specifying interactive DVB services to be available over IP enabled technologies. This includes work done within DVB-I, DVB-DASH, personalized ads, and other related services.

Current transmission standards including satellite DVB-S2, terrestrial DVB-T2, and cable DVB-C2 all support the opportunity to implement an all-IP delivery, for example, by using GSE technology. Coaxial cables are gradually being replaced by fiber optic cables, and for the existing coaxial cable networks, the focus has been shifted to obtaining more throughput for Internet services such as Netflix, YouTube, etc. by optimized DOCSIS® technologies, as opposed to higher quality TV services over DVB-C. In satellite transmission networks efforts are underway to implement an all-IP delivery with a hybrid satellite and existing IP infrastructure delivery at the end-user premises.

Within terrestrial technologies, telecom operators and DTT operators using DVB-T2 are competing for access to the same spectrum in the UHF-band. With reference to the development of 5G technologies, there may be a need for both technologies within the same spectrum. Implementing and operating an all 5G-based network requires adaptation of the entire ecosystem, and the costs for operating such a network may be significant compared to implementing and operating a DVB-T2 network. A gradual upgrade of the existing DVB-T2 ecosystem to an all-IP system could define an all-new TV service infrastructure inspired by the work done to implement the ATSC3.0 standard and the specification DVB-I. The ATSC3.0 standard provides for delivering broadcast-quality TV services over broadband. Unlike traditional broadcasting, modern TV channels and individual programs specified by DVB-I and ATSC3.0 are simply URLs pointing to content (video, css, java script, html) and metadata (xml, json etc.) as in the domain of web streaming. As a result, all channels can be transmitted over any IP-enabled technology depending on technology as a live feed (multicast/broadcast) or as on-demand (unicast).

Opportunities emerge when moving from broadcast to a 100% IP based infrastructure and delivery, as opposed to traditional broadcast serving MPEG-2 transport streams only. A particular opportunity is to deliver dynamic unicast assisted M-ABR to modern OTT compatible devices over the same physical infrastructure, and to use more efficient encoding as more advanced decoders are developed. More efficient spectrum use may result in a 70% average lower bitrate. With a dynamic multicast assisted by unicast implementation and, depending on the network infrastructure, strategically placed web caches, bandwidth limitations can be overcome using more contemporary techniques.

Such a solution may be implemented by installing a software agent into each STB or every modem on an existing network. However, updating the firmware in each device to include these features could be very cumbersome, as there are typically many versions of modems and STBs utilized in an existing network, representing a significant effort to update and maintain all the devices. In addition, a disadvantage of implementing an agent into an STB is that the multicast signal has to be transmitted to the STB from the modem. In most cases, IP-enabled devices are connected wirelessly using WiFi and not through an Ethernet cable, and sending a multicast signal over WiFi is not an option, due to the nature of a multicast signal using unreliable UDP traffic.

US20170094345 discloses methods and systems for selecting and delivering content where content can be delivered to an output device from a user device through a device adaptor, such as an over-the-top (OTT) device. The OTT device or devices available to the user device are determined by a communication server. In particular, the OTT device or devices available to the user device are limited to those OTT devices associated with an output device in the user's room, or that the user is otherwise authorized to access.

SUMMARY

In a first aspect, the disclosed embodiments are directed to a smart casting device including a broadcast hardware interface coupled to a plurality of external program material sources, a network controller coupled to one or more digital devices through a network, a service logic controller configured to control the broadcast hardware interface and the network controller to advertise services provided through a plurality of external program material sources to the one or more digital devices, convey, to one or more service providers accessible through the identified external program material sources, subscriptions from the one or more digital devices for program services, and in response to the subscriptions, receive the program services from the one or more service providers and provide the received program services to the one or more subscribing digital devices.

Thus, there is provided a system in which a smart casting device is included. The smart casting device forms an intelligent in-home media gateway, controlled by customized software installed on the user devices—in other words, a "smart casting" is taking care of transcasting the incoming media to a compatible format for streaming to the end devices. The present system is not about mixing services based on the user requests. Instead, the present system transforms any incoming feeds coming from cable, wireless, satellite, or terrestrial to a compatible format to be streamed to the end user device. The present system of smart casting can be considered as a webtuner, for comparison, as it removes the necessity to use the built-in tuner on the television. In a nutshell, in the present system, the one and same segmented/chunked video feed is requested to be seamlessly distributed over different technologies (internet, satellite, terrestrial), and be gathered again in the smart casting device and then distributed as a compatible feed on the local network in-home. This is very different from gathering different video feeds via different distribution channels and composed into one video service guide, as is known in the art.

The smart casting device is intended to be the enabler for making TV services part of the IoT ecosystem called "Smart Homes". By enabling this, it is possible for other devices to subscribe to the services on the local network. It could be that the user wants to watch the video feed on a projector and have the audio in the headphones and suddenly asks his voice assistant to move the feeds to his television to continue watching ("follow me" feature). Without the smart casting device, the user would have to manually open the video feed on an app in a set-top box connected to the projector, and then manually connect the headphones to this set-top box using e.g. the Bluetooth protocol. This can be done automatically using a smart casting device and cannot be performed using state of the art systems. With the smart casting device, a user does not need to do an active subscription to the smart casting device, as this is only a "service worker/stream composer" and not a "service merger". The smart casting device can be compared to a Chromecast® device with more smart features and connected to the users' modems.

The smart casting device resembles a support device, i.e. an enhanced Google® Chromecast®, to render it possible for a service provider to get access to different interactive content from any distribution technology and present it to the user on any of this person's devices in a personalized way.

The broadcast hardware interface may be configured to identify the one or more external program material sources coupled to the broadcast hardware interface and convey the identifications to the network controller.

The subscriptions from the one or more digital devices may include device capabilities of the digital devices for receiving program services from the one or more service providers.

The subscriptions from the one or more digital devices may include a subscription to a particular program service from the one or more service providers.

The service logic controller may further be configured to prioritize service provision for the one or more digital devices according to rules of a service provider providing the program service. This allows handling a situation, where a smart casting device is using its sole tuner for streaming to a mobile screen, and then a TV logs on and want to stream another channel needing the tuner. The smart casting device should then recognize the TV, let it use the tuner, and move the mobile device seamlessly to normal unicast streaming.

The smart casting device may further include a transcaster and packager, where the service logic controller is configured to control the broadcast hardware interface to provide the received program services to the transcaster and packager, and where the transcaster and packager is configured to convert program material received in multicast format to unicast format and provide program material in unicast format to the one or more subscribing digital devices through the network controller.

The smart casting device may further include a web server configured to provide cached program services in response to requests from the digital devices.

The smart casting device may further include a dynamic advertisement controller configured to insert advertisement content into the program services provided to the digital devices.

The smart casting device may further include a statistics monitoring and reporting function configured to report statistics related to reception and delivery of program services to the one or more digital devices.

The smart casting device may further include a pluggable hardware interface for providing one or more of additional memory and processing devices.

The smart casting device may further include a software extensions module for provisioning additional extension programs for use by the smart casting device.

In a second aspect, the disclosed embodiments are directed to a method of providing multicast to unicast services to one or more digital devices within a network from a plurality of program material sources external to the network, including identifying one or more of the one or more program material sources external to the network, advertising services provided through the external program material sources to the one or more digital devices within the network, conveying to one or more service providers accessible through the identified external program material sources, subscriptions from the one or more digital devices for program services, in response to the subscriptions, receiving the program services from the one or more service providers, converting multicast program services received from the one or more service providers to unicast program services, and providing the unicast program services to the one or more subscribing digital devices.

The subscriptions from the one or more digital devices may include device capabilities of the digital devices for receiving program services from the one or more service providers.

The subscriptions from the one or more digital devices may include a subscription to a particular program service from the one or more service providers.

The method may include prioritizing the provision of the program services for the one or more digital devices according to rules of a service provider providing the program service.

The method may include providing cached program services in response to requests from the digital devices.

The method may include inserting advertisement content into the program services provided to the digital devices.

The method may further include collecting and reporting statistics related to reception and delivery of the program services to the one or more digital devices.

The method may further include providing a pluggable hardware interface for providing one or more of additional memory and processing devices.

The method may further include providing a software extensions module for storing additional extension programs for use by the smart casting device.

The method may further include the service delivered being be value-added by 3rd party service providers other than the service provider currently operating the smart casting device.

The method may further include enforcing policies specifying different service tiers defined by the service provider operating the smart casting device, preferably these service tiers specify all or specific 3rd party service providers or specific features allowed to be used by 3rd party service.

The method may further include the casting device keeping keep track on the service enrichment features and ensuring to report back to the service providers, how the service was used and value-added to be accounted correctly. The service tier specification can be applied as part of the service bootstrap or be dynamically applied or updated during operation of the smart casting device.

In at least one further aspect, the disclosed embodiments are directed to an application stored on a non-transitory computer-readable medium of a digital device on a network including a smart casting device, wherein the application in combination with a processor of the digital device, cause the digital device to; issue a query to discover the smart casting device; upon discovery of the smart casting device, receive bootstrap information for exchanging information between the smart casting device and the application; query the smart casting device for a particular service provided by a plurality of input sources external to the network; and receive the particular service upon the smart casting device determining that the particular service is available.

The application may be configured to relay the particular service to the digital device after it is received on the smart casting device.

The application may be configured to receive an existing set of bootstrap information on the digital device from the smart casting device.

The application may be configured to send a new set of bootstrap information from the digital device the smart casting device.

The application may be configured to instruct the smart casting device and/or the digital device to augment and/or prune a set of bootstrap information, preferably when the smart casting device (100) and the digital device (108) exchange bootstrap information.

The application may be configured to allow the smart casting device to receive a new set of bootstrap information by any service reachable through one or more of its plurality of input sources.

The application may be configured to periodically check for bootstrap information updates.

The application may be configured to cause the smart casting device to determine the availability of services described in the bootstrap information, and preferably expose the availability to digital devices on the network.

The application may be configured to cause the smart casting device to change its configuration to receive certain services available through one or more of its plurality of input sources, in response to receiving bootstrap information, preferably autonomously at any time deemed favorable by the smart casting device, by request from the digital device, or as instructed by any service reachable through one or more of its plurality of input sources.

DETAILED DESCRIPTION

In order to address current shortcomings in the art, a combination of technologies is disclosed herein to provide a dynamic multicast assisted by a unicast program material delivery system, hereinafter referred to as a "SmartCast device" or "smart casting device".

Figure 1:
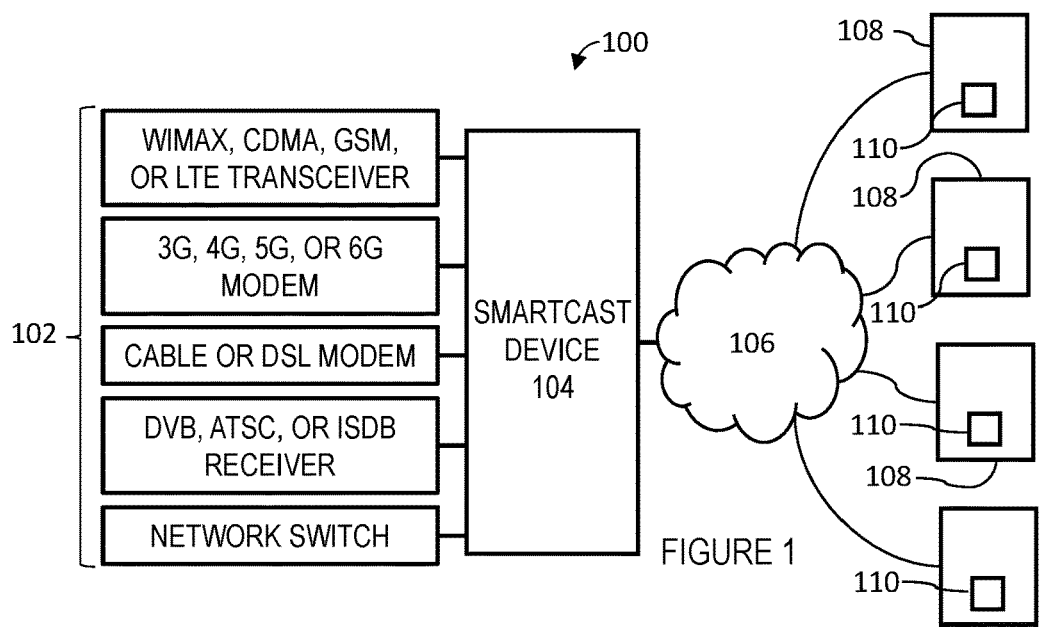
FIG. 1 shows a block diagram of a typical system in which a SmartCast device, according to the disclosed embodiments, may operate.

FIG. 1 shows a block diagram of a typical system 100 in which a SmartCast device 104 may operate. The system 100 may include one or more external program material sources 102, a network 106, and one or more digital devices 108 to which the SmartCast device 104 provides transcasting services through the network 106. For purposes of the present disclosure, "transcasting" refers to converting multicast traffic into multiple standard unicast traffic for transmission to the digital devices 108. "Transcasting" may further refer to providing manifest alternation, for example, using advertisement insertions.

The one or more external program material sources 102 may include one or more of a WiMAX, CDMA, GSM, or LTE transceiver, a 3G, 4G, 5G, 6G, cable, or DSL modem, a DVB, ATSC, or ISDB receiver, a network switch, or any other suitable source of program material.

The SmartCast device 104 generally operates to detect which of the one or more external program material sources are operationally connected to the SmartCast device 104, advertise services provided through the one or more external program material devices 102 to the digital devices 108 on the network 106, and provide program material in unicast, multicast, M-ABR, or any other suitable format, to the digital devices 108 that subscribe to the services advertised by the SmartCast device 104. The one or more external program material sources operationally connected to the SmartCast device 104 may be referred to as "input sources 102." In some embodiments, the SmartCast device 104 may be implemented as a virtual device between the input sources 102 and the network 106, for example, using edge computing technology, or as part of a content delivery network.

The network 106 may include one or more of a wired network, using for example, Ethernet or DSL, a wireless network, using for example, 802.11, worldwide interoperability for microwave access (WiMAX), 3G, 4G, 5G, 6G, CDMA, GSM, or LTE, or any other suitable existing or future network for delivering the services provided by the SmartCast device 104.

The digital devices 108 may include at least one of a mobile phone, tablet, laptop, desktop computer, computing device, TV, smart TV, STB, or any digital device capable of supporting a program or application 110 that recognizes, and is able to subscribe to, the services advertised by the SmartCast device 104. The digital devices 108 may further include devices that support a media playback protocol, for example, AirPlay, Google Cast, WiDi, or any playback protocol suitable for streaming services provided through the one or more input sources 102. The digital devices 108 may still further include streaming devices, for example, Airtame®, Apple TV®, Chromecast®, Miracast®, smart speakers, or any streaming device capable of streaming services provided through the one or more input sources 102.

Figure 2:
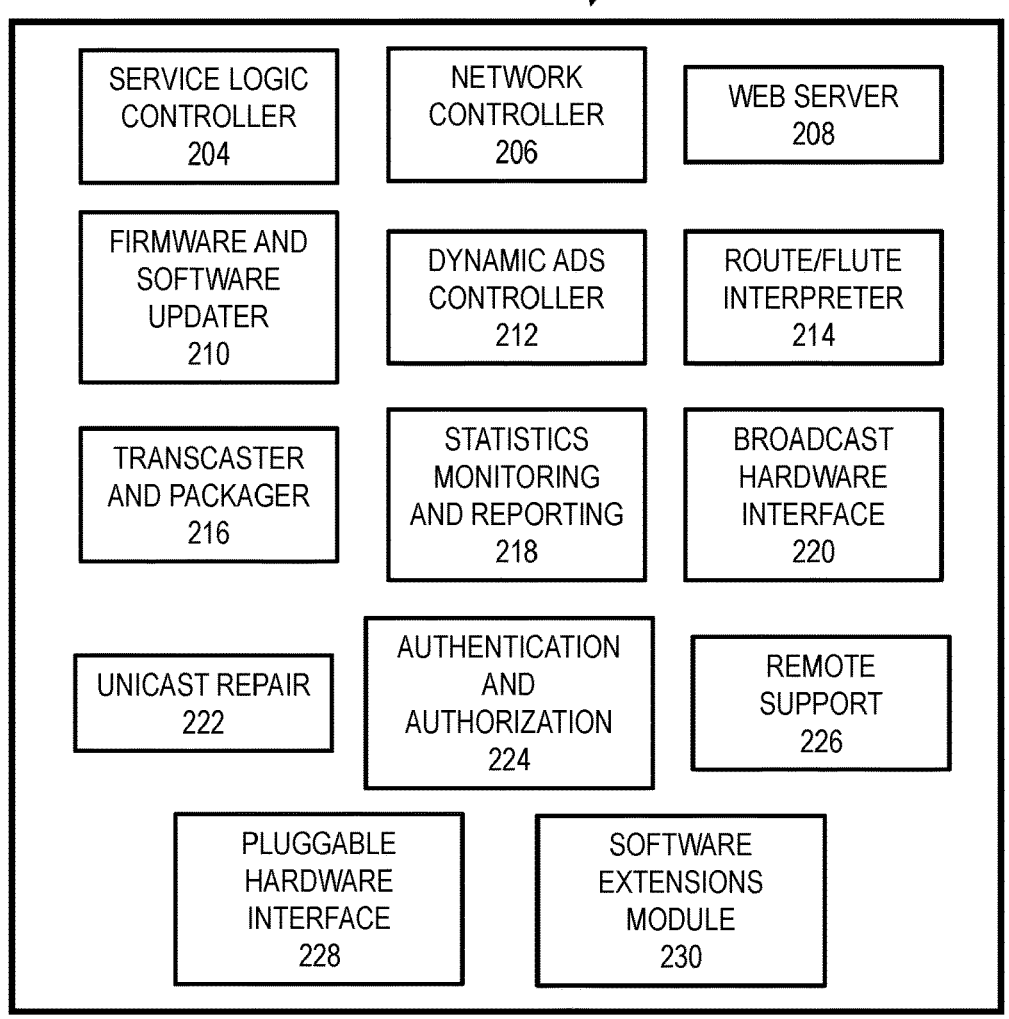
FIG. 2 depicts a block diagram of an exemplary SmartCast device.

FIG. 2 shows a block diagram of the components 200 of the SmartCast device 104. The SmartCast device 104 may include a service logic controller 204, a network controller 206, a web server 208, a firmware and software updater 210, a dynamic advertisement controller 212, a ROUTE/FLUTE interpreter 214, a transcaster and packager 216, a statistics monitoring and reporting function 218, a broadcast hardware interface 220, a unicast repair function 222, an authentication and authorization function 224, a remote support function 226, a pluggable hardware interface 228, and a software extensions module 230. For purposes of the operations of the embodiments disclosed herein, the service logic controller 204 may control the operations of the other components 200 in exchanging any data including communications, subscriptions, device capability information from the digital devices 108, program material, or any other data, with the input sources 102, among the components 200 of the SmartCast device 104, and among the digital devices 108. Generally, the broadcast hardware interface 220 may provide a data path between the input sources 102 and the SmartCast device 104, and the network controller 206 may provide a data path between the SmartCast device 104 and the digital devices 108.

Figure 3:
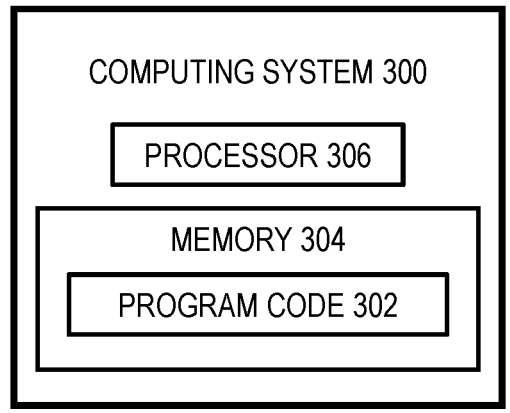
FIG. 3 shows a schematic illustration of an exemplary computing system for implementing the components of the SmartCast device.

FIG. 3 shows a schematic illustration of an exemplary computing system 300 for implementing the components 200 of the SmartCast device 104. The components 200 may have individual computing systems 300, may be implemented using a single computing system 300, or may be organized in groups among a number of computing systems 300. The exemplary computing system 300 may include computer-readable program code 302 stored on at least one non-transitory computer-readable medium for carrying out and executing the processes described herein. The computer-readable medium may include a memory 304, which may include magnetic media, semiconductor media, optical media, or any media which is readable and executable by a computer. The computing system 300 may also include a processor 306 for executing the computer-readable program code 302. In some embodiments, the memory 304 may provide storage for firmware updates to the SmartCast device 104, and storage for program material for transmission to the digital devices 108. The computing system 300 may operate a customized lightweight Linux operating system stored in the memory 304 and computing system 300 may include hardware and computer-readable program code specifically for implementing the components 200 of the SmartCast device 104. The digital devices 108 may include examples of the computing system 300, and the computer-readable program code 302 in the digital devices 108 may store the program or application 110.

Returning to FIG. 2, the service logic controller 204 may operate to control the broadcast hardware interface to detect which input sources 102 are attached and are to be included in the service announcement. The service logic controller 204 may control the service advertisement by the SmartCast device 104 to the digital devices 108 on the network 106, the exchange of service information details between the SmartCast device 104 and the digital devices 108, and reception of device capabilities from the digital devices 108. The service logic controller 204 may communicate with the digital devices through the network controller 206, and may communicate the service information details and the digital device capabilities to other components of the SmartCast device 104.

The device capability information from the digital devices 108 may include a device type, display capabilities, network interface capabilities, or other information. Some or all of the device capability information may be used to prioritize service provision for a particular digital device. In some instances, a service provider providing content through one or more of the input sources 102 may specify rules for assigning priority for particular devices. For higher priority devices, the service logic controller 204 may operate to switch lower priority digital devices to receive content from alternate input sources and provide the higher priority devices access to the specified input source. If no alternate input source is available for the lower priority devices, the SmartCast device 104 may provide notice to the lower priority devices. Procedures for handling lower priority devices may be customized.

The network controller 206 may operate to control all communication and connections between the SmartCast device 104 and the digital devices 108 over the network 106. The network controller 206 may monitor connections between the SmartCast device 104 and the digital devices 108 and automatically attempt to re-establish lost connections, including finding alternate routes and providing notifications to the service logic controller 204.

The web server 208 may generally provide content in response to unicast requests from the digital devices 108 for locally cached program material. The locally cached program material may include program material received from multicast feeds from the input sources 102 and may include content received from the ROUTE/FLUTE interpreter 214, described below. Depending on the services to which a digital device subscribes, the web server 208 may also receive content from other SmartCast components, for example, the dynamic advertisements controller 212 and the unicast repair function 222, and may mix content from any of the various input sources 102 and the components 200 for provision to the digital devices 108. In some instances, the network controller 206 may route digital device content requests to outside services through the broadcast hardware interface 220 if the content is not available on the webserver 208.

The firmware and software updater 210 may receive firmware updates for the SmartCast device 104 and application updates for the application 110 on the digital devices 108, and may control procedures for updating the firmware of the SmartCast device 104 and the applications 110 on the digital devices 108. While firmware updates are in progress, the firmware and software updater 210 may provide an announcement that the SmartCast device 104 is unavailable to digital devices subscribing to the services provided by the SmartCast device 104.

The dynamic advertisement controller 212 may be operable to control dynamic advertisement insertion into program material provided to the digital devices 108. The dynamic advertisement controller 212 may support an addressable TV infrastructure and may support multiple protocols, for example, VAST, SCTE35, MRAID, and any other advertisement insertion protocols. Depending on the availability of the advertisements, the advertisements may be provided to the dynamic advertisement controller 212 from in the components 200 of the SmartCast device 104 or may be obtained from an external service, for example, a cloud service, or any service remote from the SmartCast device 104.

The ROUTE/FLUTE interpreter 214 generally operates to extract content received from the input sources 102, including program material, web content, firmware updates, application updates, and any other appropriate content, and provide the content to any of the components 200 of the SmartCast device 104. The content sent through the ROUTE/FLUTE interpreter 214 may be orchestrated by a service provider and may be provided using a combination of push and pull strategies. A service provider can push specific content to the digital devices based on a presumption of high popularity of the content, but if some other content delivered over unicast suddenly gets an increased pull from the digital devices, the content can automatically be switched to be delivered multicast and signaled to the ROUTE/FLUTE interpreter for seamless handover from unicast to multicast.

The transcaster and packager 216 may operate to convert multicast traffic into multiple standard unicast traffic for transmission to the digital devices 108, and also may provide for manifest alternation, for example, using advertisement insertions from the dynamic advertisement controller 212. The incoming multicast content can be transcast from multiple multicast formats, for example, SPTS, MPTS, M-ABR, MMTP, and other similar formats. The output of the transcaster and packager 216 may be a standard unicast streaming format, for example, HLS, DASH, or any similar format, per digital device using any of the standard container formats like the MPEG-2 transport stream, the MPEG-4 ISO-BMFF or any proprietary, standard and future container formats. Any future or proprietary formats may be supported with an update through the firmware and software updater 210.

It should be understood that the transcaster and packager 216 do not transcode content, but only "repackages" content in order to stream on the network 106. Transcoding and other functions may be provided, for example, by using the pluggable hardware interface 228 or software extensions module 230 as described below.

The statistics monitoring and reporting function 218 may log, aggregate and report statistics about reception and delivery of content to the digital devices 108, operations of the dynamic advertisement controller, content fetched from the ROUTE/FLUTE interpreter 214, or any other media consumption, for service providers. The statistics monitoring and reporting function 218 may further monitor the "health" of the SmartCast device 104 and provide notifications to affected digital devices when unrecoverable errors occur.

The broadcast hardware interface 220 of the SmartCast device 104 may control communication with the input sources 102 coupled to the SmartCast device 104.

The unicast repair function 222 may attempt to repair a multicast feed by fetching missing packages using unicast requests to a service provider over an available Internet connection. In the case of a missing Internet connection or packages not arriving in time, the unicast repair function 222 may ensure stream conformance and continuity to avoid any head-of-line blocking due to usage of TCP or other issues depending on the transport protocol in the following delivery e.g. QUIC using UDP. The reference architecture may include various techniques to repair or recover depending on the multicast or broadcast provider technology e.g. RLNC, RaptorQ or similar. This may be part of the service description exchanged in the bootstrap process described below.

The authentication and authorization function 224 may recognize access capabilities of the digital devices 108 and provide access control for the digital devices 108 depending on an individual device's capabilities and services to which the digital device has subscribed. The authentication and authorization function 224 may also be able to act as an external DRM relay/proxy or secure key server for exchanging decryption keys over a secure connection to the user agent. The key server may be executed in a secure environment of the SmartCast device 104 using, for example, hardware-enforced isolation built into the processor 306, such as a trusted execution environment or similar technologies.

The remote support function 226 may be activated by a remote troubleshooting service provider, and with user permission may operate to provide access to the SmartCast device 104, the network 106, the digital devices 108, and the applications 110 to assist in discovering errors in the SmartCast device 104, the network 106, the digital devices 108 and applications 110, including network configuration errors, unstable network connections, missing access to an input source, application failure, or any other detectable error in the system. The remote support function 226 may also be able to launch applications locally to assist the supporter in aiding the user. To ensure privacy control, access to the remote support function 226 may only happen if a user allows access.

The pluggable hardware interface 228 may provide a hardware interface for an external device with additional functionality that may be implemented by the SmartCast device 104 including one or more of additional functions, third-party embedded multicast clients, and processing capabilities. The pluggable hardware interface 228 may also be used for local caching of large amounts of data sent as unicast, multicast or broadcast. The data could be pre-caching of AV content related to a subscription model, popular content to be watched time-shifted, or may include software updates for the digital devices 108 or other devices capable of discovering the content availability.

The software extensions module 230 may provide for provisioning functions under development, additional functions, optional functions, custom operations, vendor-specific proprietary functions, third-party embedded multicast clients, or any other additional capabilities of the SmartCast device 104. One example may include a transcoding service to be used by the transcaster and packager described above. Another example may be a service including an intermediate middleware layer for interpreting existing standards like service frameworks based on HbbTV, ATSC3.0, DVB-I and the like and translating these into SmartCast services that can be discovered and executed as explained below.

Figure 4:
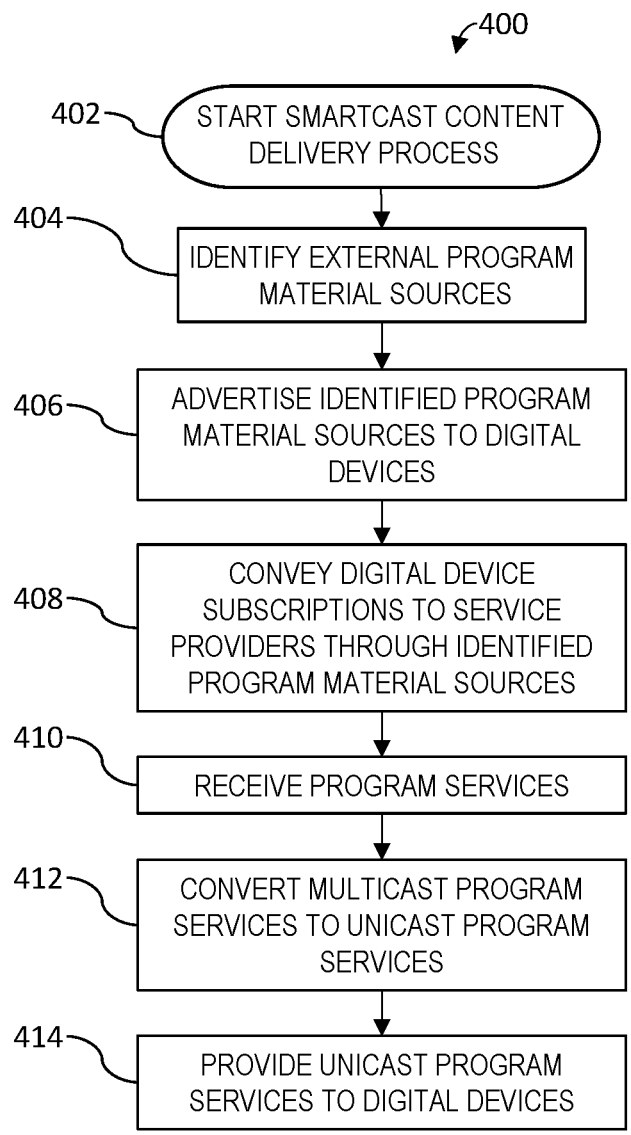
FIG. 4 illustrates an exemplary content delivery process performed by the SmartCast device.

FIG. 4 illustrates an exemplary content delivery process 400 that may be performed by the SmartCast device 104. The content delivery process 400 may provide multicast to unicast services to one or more of the digital devices 108 within the network 106 from one or more of the input sources 102 external to the network 106. The process may be started by the SmartCast device 104 as shown in block 402. In block 404, one or more of the one or more program material sources 102 external to the network 106 may be identified. The SmartCast device 104 may operate to cause the identified external program material sources 102 to be advertised to the one or more digital devices 108 as shown in block 406. As shown in block 408, the SmartCast device 104 may coordinate conveying subscriptions from the one or more digital devices 108 for program services to one or more service providers accessible through the identified external program material sources 102. In response to the subscriptions, the SmartCast device 104 may receive the program services from the one or more service providers as shown in block 410, and may direct conversion of multicast program services to unicast program services as shown in block 412. As shown in block 414, the unicast program services may be provided to the digital devices 108.

Figure 5:
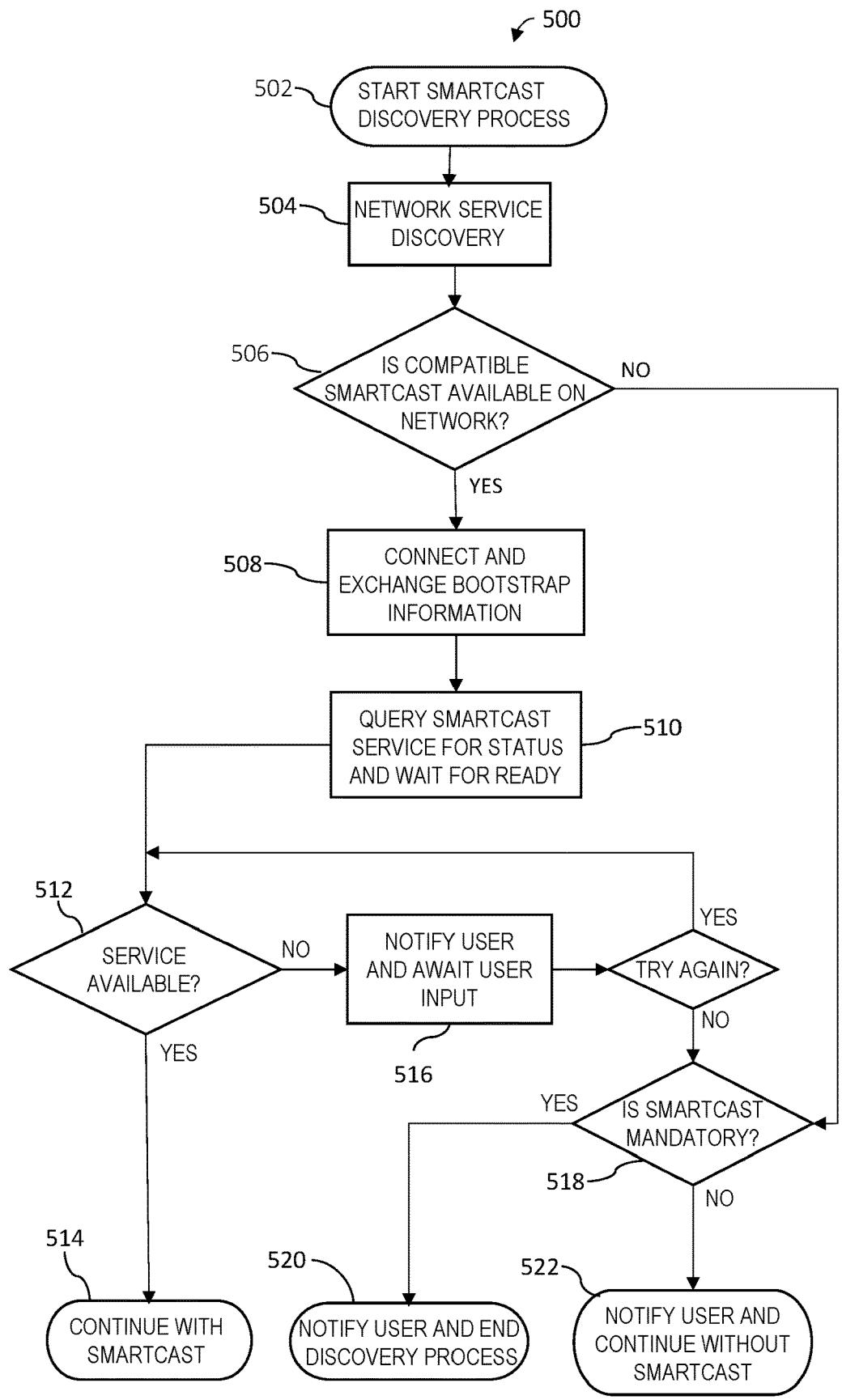
FIG. 5 illustrates an exemplary discovery and bootstrap process implemented by an application in combination with the SmartCast device.

FIG. 5 illustrates an exemplary discovery and bootstrap process 500 implemented by the application 110 in combination with the SmartCast device 104.

As shown in block 502, the application 110 on a digital device 108 is initiated and begins a network service discovery process as shown in block 504, where the application 110 of the digital device 108 queries for a compatible SmartCast device 104, as shown in block 506. As shown in block 508, in the event that the SmartCast device 104 is discovered, the SmartCast device 104 and the application 110 establish a connection, and the application 110 and the SmartCast device 104 exchange bootstrap information. The bootstrap information may include the identified ones of the input sources 102, device capability information from the digital devices, procedures, commands, and responses for communications between the SmartCast device 104 and the digital devices 108, and any other information for exchanging data among the SmartCast device and the digital devices 108. As shown in block 510, the application 110 queries the SmartCast device 104 for a particular service that may be provided through the identified input sources, and as shown in block 512, the SmartCast device 104 determines whether the particular service is available. In the event that the desired service is available, the SmartCast device 104 proceeds to deliver the service to the digital device 108, as shown block 514. As shown in block 516, in the event that the desired service is not available, the SmartCast device 104 provides a notification to the digital device 108 application 110 and requests user input as to whether or not to try again. If the application detects a user input indicating to try again, the SmartCast device 104 determines again as to whether the particular service is available, as shown in block 512. If the application detects a user input indicating not to try again, or if no compatible SmartCast device is available from the determination in block 506, a determination is made as to whether the particular service must be provided through the SmartCast device, as shown in block 518. If the provision through the SmartCast device is mandatory, the application 110 notifies the user that the particular service is not available through the SmartCast device 104 and the discovery process is terminated, as shown in block 520. If the provision through the SmartCast device is not mandatory, the application 110 notifies the user, and the service may be provided without utilizing the services of the SmartCast device 104, as shown in block 522.

Referring to FIG. 1, the program or application 110 that recognizes, and is able to subscribe to, the services advertised by the SmartCast device 104 may also provide support for casting to other digital devices 108, for example, devices that support a media playback protocol and streaming devices as mentioned above. An application 110 in a first digital device 108 may operate as a mediator for a second digital device 108 by establishing a connection and exchanging bootstrap information with the SmartCast device 104, and querying the SmartCast device 104 for a particular service. In the event that the desired service is available, as part of the service delivery, the SmartCast device 104 may provide credentials for accessing the service. The application 110 in the first digital device 108 may pass the credentials to a second application 110 in the second digital device 108, and the second application 110 may establish a connection to the SmartCast device 104 and receive the particular service. The SmartCast device 104 and the application 110 may include the capability to use specific APIs of any AI-assisted devices, for example, Google Assistant™, Siri® and Alexa to find and stream content. The SmartCast device 104 and the application 110 may further include the capability to utilize any of the interaction and services defined by the AI-assisted devices, for example, to access the capabilities of other devices controlled by the AI-assisted devices, make verbal searches, or perform any other interaction provided by the AI-assisted devices.

The SmartCast device may include the following variants:

SmartCast Lite: This may be the IP multicast variant, where the feeds are delivered as multicast over a cabled or FWA using any compatible wireless technology managed or unmanaged network. This can be DOCSIS®, fiber or similar. This variant of the SmartCast device may be the basic building block for the rest of the variants.

SmartCast Broadcast (ATSC): This variant may be somewhat bigger than the Lite edition, as a connector (such as an F-connector, SMA, MCX or similar) may be available as well to connect an antenna cable. All broadcasts editions may have the opportunity to include a SIM-card slot as well, if, for example, the operator requires a physical CA-card based solution. This solution may also include whole or parts of the ATSC3.0 middleware in order to support the receiving devices.

SmartCast Broadcast (DVB): Like the above, just with IP compatible technologies over DVB-x2 and supported middleware for these. It may be possible to support HbbTV, to interpret the DVB-I standard and other relevant current and upcoming service infrastructures and media technologies related to the delivery.

SmartCast Pro: This may be a variant of the broadcast editions of SmartCast, and may also include a multiple tuners/demodulators solution to serve more than one device at a time. This variant may be mainly intended for business to business to fetch, prepare and serve media content on larger established network infrastructures with multiple users connected (transportation, public buildings, apartment blocks, etc.). The SmartCast Pro could e.g. be a standard 1RU server with expansion cards containing multiple tuners and installed in the same rack as the network equipment for the local area. This could be one or more of a 3G, 4G, 5G, 6G, WiFi, cabled, or any other existing or future network infrastructures. The server may be dimensioned after determination of the number of users and content to be served.

SmartCast Mobile: May include both a SIM-card slot and a connector suitable for connecting a mobile transmission antenna, for example, 3G, 4G, 5G, 6G or any other mobile communication transmission technology, to the SmartCast device. The SmartCast Mobile may interpret any mobile broadcast/multicast signal, for example, FeMBMS, enTV, IMB, M-ABR and the like. If the SmartCast device is already connected to a 5G modem, the SmartCast Lite variant may be sufficient.

SmartCast STB: This device may also include the STB feature inside, and may render and transmit the output live over a wireless protocol, for example, 5G, wireless HDMI, or any suitable existing or future wireless protocol, to a lightweight receiver on the TV. This is different from a Chromecast® or an HDMI dongle, as these are the STB themselves connected to the TV via HDMI. The SmartCast device may still be connected to the switch or a modem and be able to serve other devices on the network without being an STB for them like e.g. Smartphones, tablets or PCs. This variant is any of the Lite, ATSC, DVB, and/or Mobile with one or more STBs. To sum up, this STB edition of the SmartCast is a combination of a SmartCast Lite, ATSC or DVB combined with a more advanced SoC capable of rendering graphics like GUI components, decode AV content and retransmit the content using other protocols suitable for remote presentations (Miracast, WiDi and similar).

SmartCast Cloud STB: This may be a variant of the SmartCast STB, where the SmartCast device may be part of an online ecosystem (for example cloud-based) either as dedicated hardware connected in the ecosystem's infrastructure or as an online virtual or augmented STB service that can be spawned and operated in the ecosystem on request, for example from a digital device 108. The SmartCast Cloud STB may be customized to a specific account associated with the digital device 108 or a user of the digital device. Commands from the digital device program or application 110 may be translated to network requests to the SmartCast Cloud STB, rendered by the SmartCast Cloud STB and sent back to the commanding program or application 110 as video and rendered on the digital device 108. The UI, application, any feature, or appearance of the SmartCast Cloud STB may be customized according to, for example, an operator or vendor's specifications, and a digital device user may have a range of customized SmartCast Cloud STBs to choose from. The SmartCast Cloud STB may be operated from any digital device connected to the network, including those using wired or wireless connections, including any suitable communication technologies.

As long as all devices are in the same sub-network, the SmartCast may work with virtually any smart device like a smartphone, tablet, smart TVs, Android TV, STBs, and casting devices. The SmartCast device may announce its services on the network, and as a rule of thumb, when a smart device with a SmartCast aware app connects to SmartCast, the service is no longer announced by the SmartCast. When the session is then terminated, the service becomes available again. This is e.g. the case, if the SmartCast device only has one tuner and demodulator service available. For the case of multiple tuner and demodulators, the amount of services available per SmartCast also increases. If the multicast feeds are available from the network, and not through the number of available tuners and demodulators, the number of served clients may be mainly depending on the processing power of the SmartCast. The more CPU processing power with a proper amount of memory in the SmartCast reference hardware, the more clients can be served.

If multiple SmartCast devices are operating in the same network, they may not interfere with each other. The SmartCast aware app may subscribe to any SmartCast, depending on the service, the consumer requests. This SmartCast can via software upgrades always be extended to support other standard or proprietary technologies and protocols.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments may still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

The invention claimed is:

1. A smart casting device comprising:
a broadcast hardware interface configured to be coupled to a plurality of external program material sources;
a network controller coupled to one or more digital devices through a network;
a service logic controller configured to control the broadcast hardware interface and the network controller to:
advertise services provided through the plurality of external program material sources to the one or more digital devices;
convey, to one or more service providers accessible through the identified external program material sources, subscriptions from the one or more digital devices (108) for program services; and
in response to the subscriptions, receive the program services from the one or more service providers and provide the received program services to the one or more subscribing digital devices;
wherein the broadcast hardware interface is configured to identify the plurality of external program material sources coupled to the broadcast hardware interface and convey the identifications to the network controller;
the smart casting device further comprising a transcaster and packager, wherein the service logic controller is configured to control the broadcast hardware interface to provide the received program services to the transcaster and packager,
wherein the transcaster and packager is configured to convert program material received in multicast format to unicast format and provide program material in unicast format to the one or more subscribing digital devices through the network controller.

2. The smart casting device of claim 1, wherein the subscriptions from the one or more digital devices include device capabilities of the digital devices for receiving program services from the one or more service providers.

3. The smart casting device of claim 1, wherein the service logic controller is further configured to prioritize service provision for the one or more digital devices according to rules of a service provider providing the program service.

4. The smart casting device of claim 1, further comprising a web server configured to provide cached program services in response to requests from the digital devices.

5. The smart casting device of claim 1, further comprising a dynamic advertisement controller configured to insert advertisement content into the program services provided to the digital devices.

6. The smart casting device of claim 1, further comprising a pluggable hardware interface for providing one or more of additional memory and processing devices.

7. A method of providing multicast to unicast services to one or more digital devices within a network from a plurality of program material sources external to the network, comprising:
identifying one or more of the plurality of program material sources external to the network with a smart casting device;
advertising services provided through external program material sources to the one or more digital devices within the network with said smart casting device;
conveying to one or more service providers accessible through the identified external program material sources, subscriptions from the one or more digital devices for program services with said smart casting device;
in response to the subscriptions, receiving the program services from the one or more service providers with said smart casting device;
converting multicast program services received from the one or more service providers to unicast program services with said smart casting device; and
providing the unicast program services to the one or more subscribing digital devices with said smart casting device.

8. The method of claim 7, wherein the subscriptions from the one or more digital devices include device capabilities of the digital devices for receiving program services from the one or more service providers.

9. The method of claim 7, comprising prioritizing provision of the program services for the one or more digital devices according to rules of a service provider providing the program service.

10. The method of claim 7, further comprising providing cached program services in response to requests from the digital devices.

11. The method of claim 7, further comprising inserting advertisement content into the program services provided to the digital devices.

12. The method of claim 7, further comprising providing a pluggable hardware interface for providing one or more of additional memory and processing devices.

13. The method of claim 7, further comprising providing a software extensions module for storing additional extension programs for use by the smart casting device.

14. An application stored on a non-transitory computer-readable medium of a digital device on a network including a smart casting device, wherein the application in combination with a processor of the digital device, cause the digital device to;

issue a query to discover the smart casting device;

upon discovery of the smart casting device, receive bootstrap information for exchanging information between the smart casting device and the application;

use the smart casting device to identify one or more of a plurality of program material sources for a particular service provided by a plurality of input sources external to the network;

advertise services provided through the identified external program material sources to the digital device on the network with the smart casting device;

convey to one or more service providers accessible through the identified external program material sources, subscriptions from the digital device for program services with the smart casting device;

in response to the subscriptions, receive the program services from the one or more service providers with the smart casting device;

converting multicast program services received from the one or more service providers to unicast program services with said smart casting device; and provide the unicast program services to the subscribed digital device with the smart casting device.

15. An application according to claim 14, configured to receive an existing set of bootstrap information on the digital device from the smart casting device.

16. An application according to claim 14, configured to send a new set of bootstrap information from the digital device to the smart casting device.

17. An application according to claim 14, configured to instruct one or more of the smart casting device or the digital device to at least one of augment or prune a set of bootstrap information when the smart casting device and the digital device exchange bootstrap information.

* * * * *